No. 841,079. PATENTED JAN. 8, 1907.
J. J. ENGLERT.
TAG FEEDER FOR TAG WIRING MACHINES.
APPLICATION FILED FEB. 12, 1906.

5 SHEETS—SHEET 1.

Witnesses
W. H. Durand
Geo. E. Tew

Inventor
Joseph J. Englert,
By Milo B. Stevens & Co.
Attorneys

No. 841,079. PATENTED JAN. 8, 1907.
J. J. ENGLERT.
TAG FEEDER FOR TAG WIRING-MACHINES.
APPLICATION FILED FEB. 12, 1906.
5 SHEETS—SHEET 2.
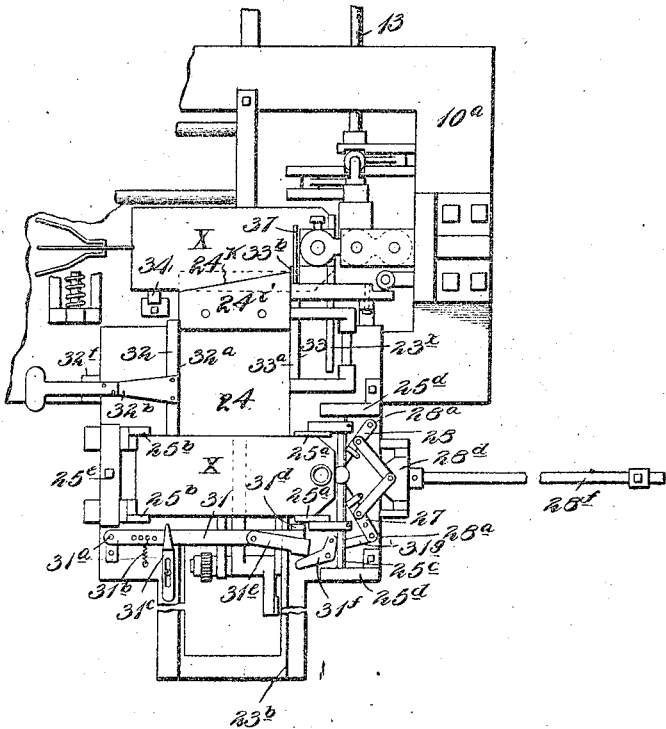

No. 841,079. PATENTED JAN. 8, 1907.
J. J. ENGLERT.
TAG FEEDER FOR TAG WIRING MACHINES.
APPLICATION FILED FEB. 12, 1906.
5 SHEETS—SHEET 3.
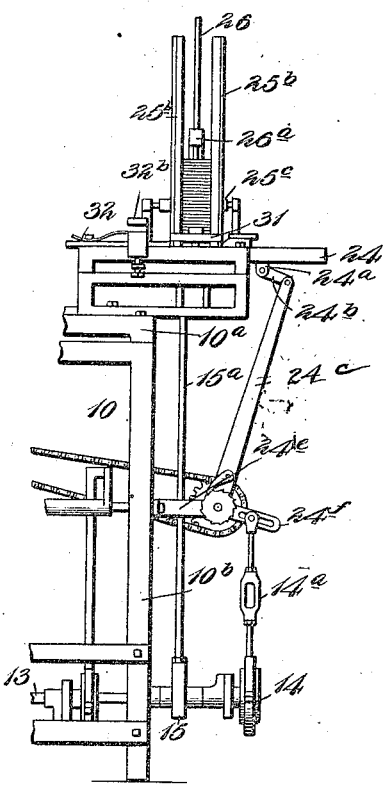
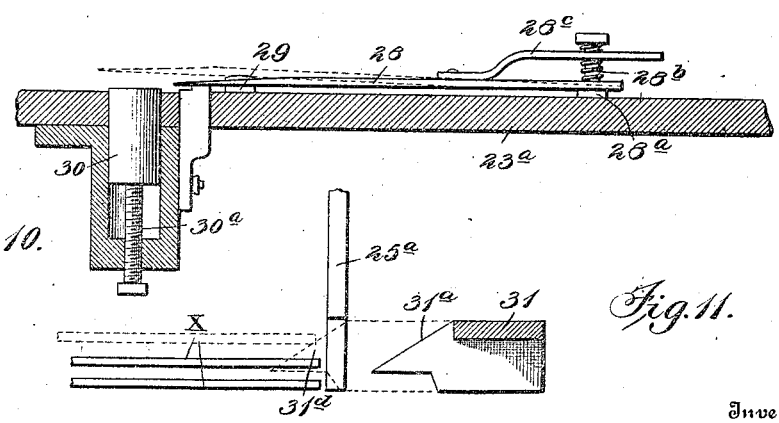

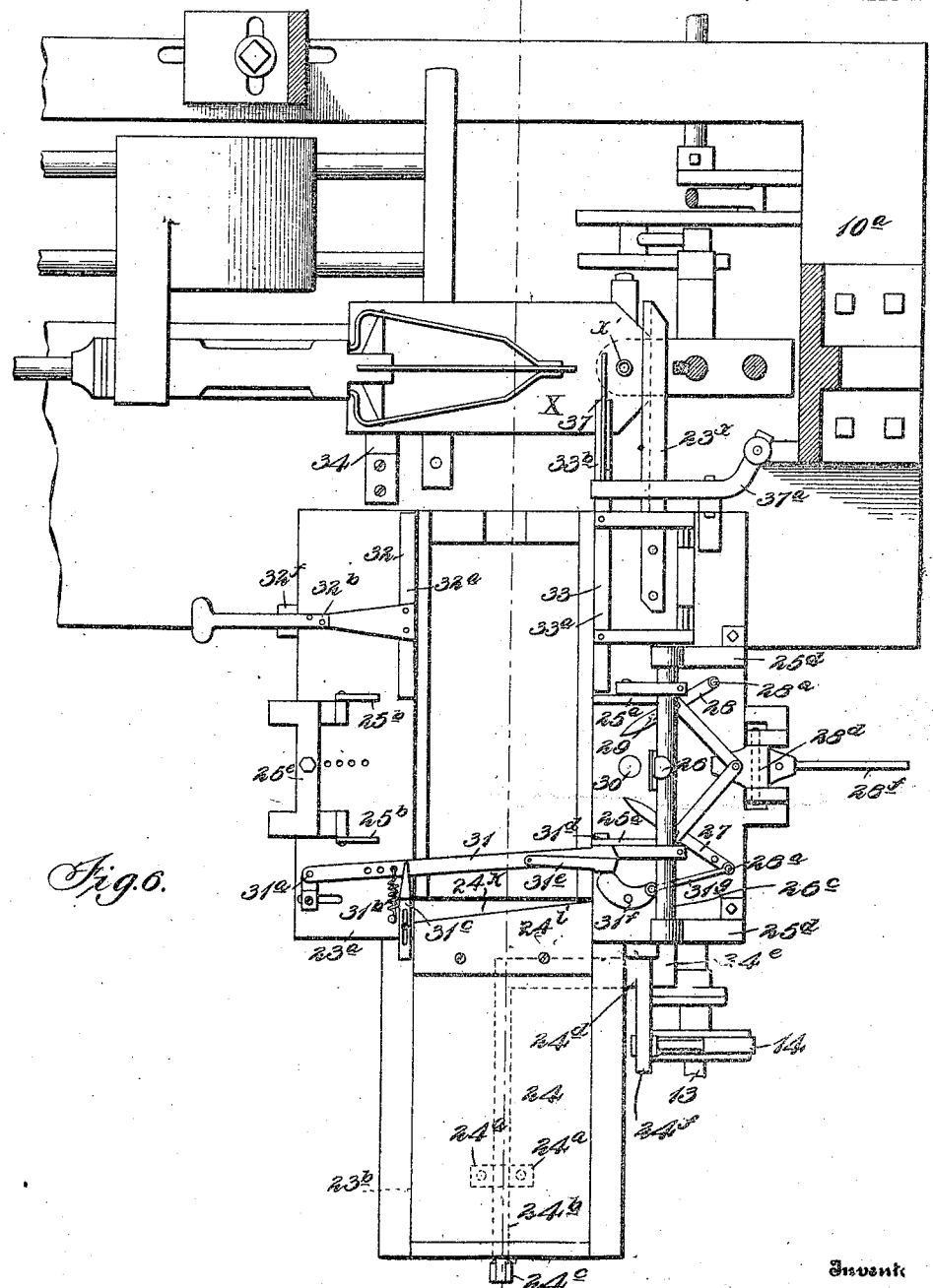

No. 841,079. PATENTED JAN. 8, 1907.
J. J. ENGLERT.
TAG FEEDER FOR TAG WIRING MACHINES.
APPLICATION FILED FEB. 12, 1906.
5 SHEETS—SHEET 5.
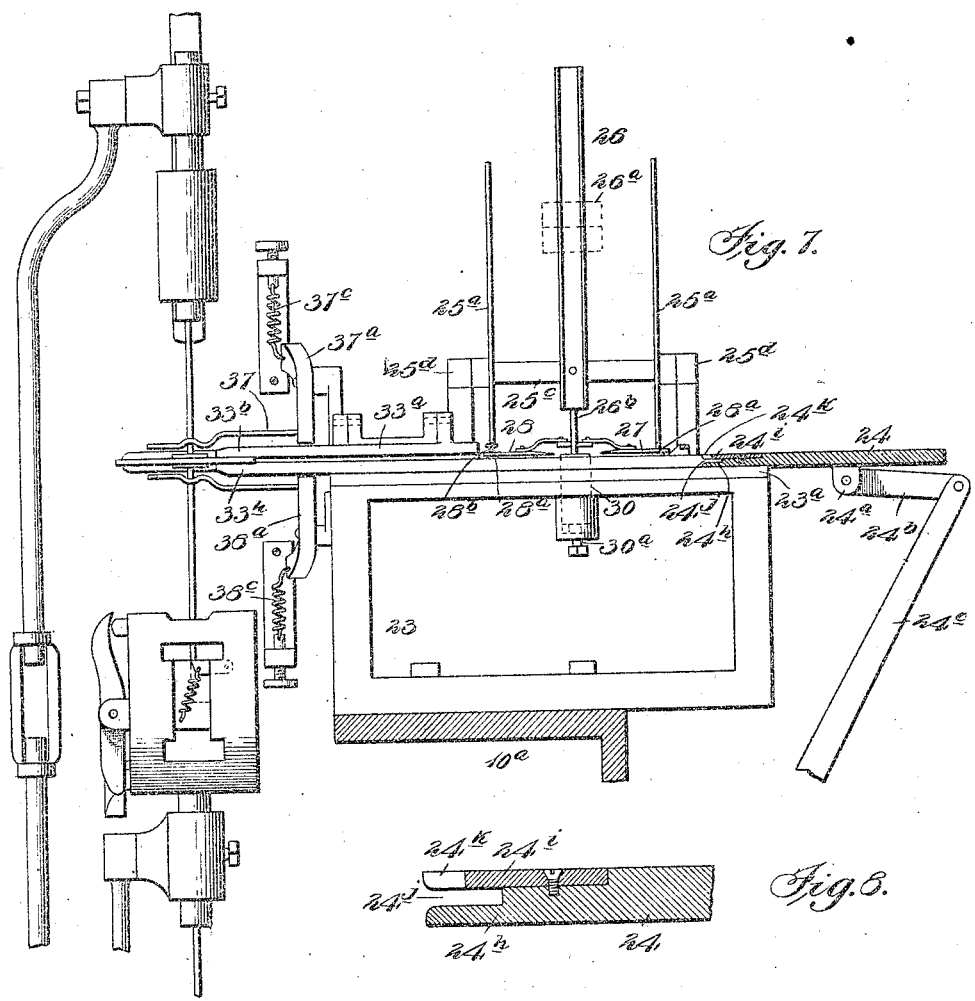

UNITED STATES PATENT OFFICE.

JOSEPH J. ENGLERT, OF CHICAGO, ILLINOIS.

TAG-FEEDER FOR TAG-WIRING MACHINES.

No. 841,079.    Specification of Letters Patent.    Patented Jan. 8, 1907.

Original application filed September 15, 1905, Serial No. 278,662. Divided and this application filed February 12, 1906.
Serial No. 300,663.

*To all whom it may concern:*

Be it known that I, JOSEPH J. ENGLERT, a citizen of the United States, residing at Chicago, in the county of Cook and State of Illinois, have invented new and useful Improvements in Tag-Feeders for Tag-Wiring Machines, of which the following is a specification.

This invention is a division of the invention disclosed in my pending application, Serial No. 278,662, filed September 15, 1905, on a tag-wiring machine.

The present invention relates to the means for feeding the tags to the machine which wires the same. Means are particularly provided for feeding reinforced tags—that is, tags with a reinforcement around the hole. Said tags are separated and fed one at a time from the bottom of the magazine.

The machine comprises a slide or tag carrier which takes a tag at each forward movement, a separation of the lowest tag in the magazine being effected, as will more fully appear from the following description and the drawings.

Figure 1:
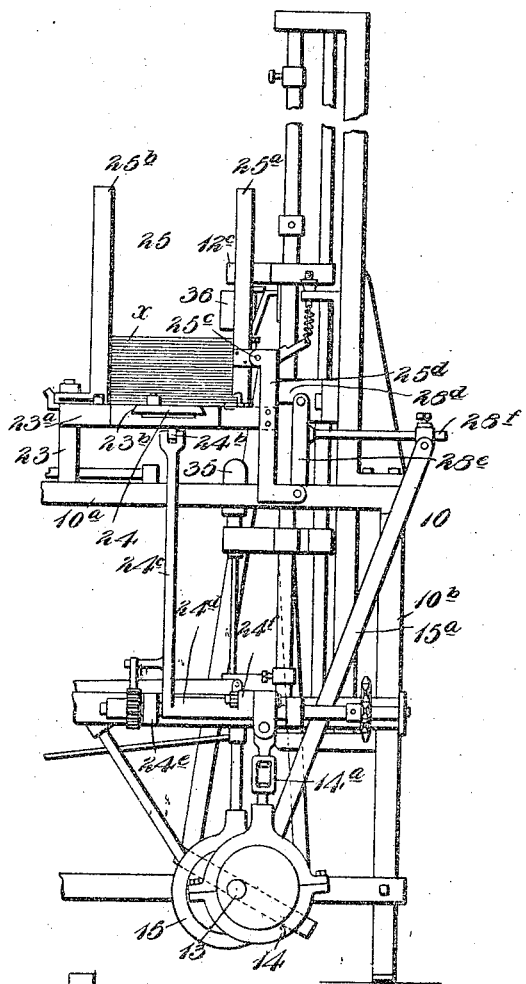
Figure 4:
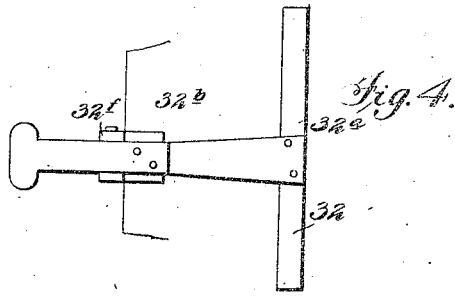
Figure 5:
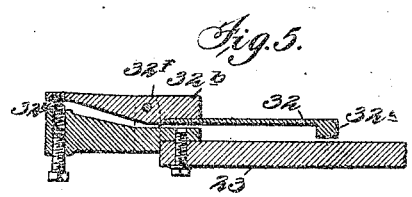

In the accompanying drawings, Figure 1 is a front view of the machine, showing the tag-feeding devices, other parts being broken away. Fig. 2 is a top plan view of the same, parts also being broken away. Fig. 3 is an end elevation with parts of the machine broken away. Figs. 4 and 5 are details in plan and section of a presser device forming part of the feeding-magazine. Fig. 6 is a plan view of the tag-feeding devices, the parts being in position where the bottom tag in the magazine has been separated to be engaged by the carrier which is ready to move forward and carry the tag to the wiring devices. Fig. 7 is a section and elevation on the line 7 7 of Fig. 6. Fig. 8 is a detail in section of the front end of the tag feeder or carrier. Fig. 9 is an enlarged detail of the blades for separating the lowest tag from those above it in the magazine. Fig. 10 is a detail in section of the same and associated parts. Fig. 11 is a further detail showing the means for separating the lowest tag from those above. Fig. 12 is a perspective view of one of the tags.

Referring specifically to the drawings, 10 indicates the main frame, which is of metal and has a table $10^a$, having suitable apertures for several of the parts to operate through. Supporting this table are legs $10^b$. The main drive-shaft 13 is mounted in bearings on suitable brackets or parts of the frame. Mounted upon this shaft is an eccentric 14 for moving a slide which feeds each tag forward into a position for the wiring action. The shaft also has as eccentric 15 for actuating a device which allows but one tag at a time to be moved by the feed-slide.

The feeding devices are constructed as follows: 23 is a small table attached to the top of the main frame and projecting outwardly and forwardly from same. The top $23^a$ of this table has a grooved way $23^b$, in which slides a reciprocating feed-plate or carrier 24. This plate is actuated by suitable connections to the eccentric 14 on the main shaft 13.

The connections are as follows: On the bottom of the plate 24 are lugs $24^a$, to which is attached a connecting-rod $24^b$ to a lever $24^c$, projecting from a sleeve $24^d$, mounted on a suitable bearing in a bracket $24^e$. $24^f$ is a slotted crank-arm attached to the sleeve $24^d$. Between the crank $24^f$ and the eccentric 14 is an adjustable connecting-rod $14^a$. The slotted crank $24^f$ permits the stroke or reciprocating distance of the plate 24 to be regulated, while the set of the eccentric 14 on the shaft allows the movement of the plate 24 to be regulated to accord with the movements of parts of the other devices. Mounted on the table-top $23^a$ are four vertical corner-pieces or guideways $25^a$ $25^a$ and $25^b$ $25^b$. These guideways form a magazine or chute 25, into which the unwired tags are placed. The guideways $25^a$ are mounted adjustably on a rod $25^c$, attached to brackets $25^d$. The guideways $25^b$ are also adjustable by means of a clamp $25^e$, which secures a foot of each of the guideways to the table-top $23^a$. Thus the chute may be made to adapt itself to various-sized tags.

26 is a vertical rod or post attached near its lower end to the rod $25^c$. This post serves as a guide upon which a weight $26^a$ slides, the said weight resting on the tags. This post also serves as a guide for the ends of tags having their corners cut away. The lower end of the post consists of a thin metal strip $26^b$, so as to permit the pivoted feed-blades to pass same.

27 and 28 are separating-blades pivoted to the table-top $23^a$ of the machine. Normally these blades stay in the position shown in Fig. 2 and are intended for the purpose of separating the lowest tag, so that only one tag at a time can be taken forward by the carrier or plate 24.

Referring to the tag, (which is indicated by X,) $x$ is an eyelet in same, $x'$ $x'$ are reinforcements to strengthen the eyelet, and Y is the wire inserted and twisted. These reinforcements $x'$ cause the tags when piled up before they are wired to have a slight space between each other, so that when the blades or fingers are actuated so as to assume their forward position the said blades insert their points between the lowest tag and the remaining ones above. These blades also tend to hold the bottom tag in a proper or even position, so as to be readily engaged by the carrier 24 in its forward movement. The second blade 28 is engaged by a small stud 29 as it reaches the end of its movement, and this causes the blade to rise slightly, so as to prevent the next or second tag from following the bottom tag when it passes through the openings at the bottom of the guideways or from getting stuck in same.

The blades 27 and 28 are each pivoted at $28^a$ at one side of the table. The blade 28 has a small spring $28^b$, which causes the blade to resume a slightly lower position after it returns off the stud 29. $28^c$ represents connecting-bars attached to the blades and to a head $28^d$, mounted on a tilting bracket and lever device $28^e$, and this is provided with an arm $28^f$, from which a connecting-rod $15^a$ is attached to the eccentric 15 on main shaft. The movement of this eccentric swings the lever $28^e$ and operates the blades 27 28.

30 is an adjustable block projecting slightly above the table and upon which the reinforced ends of the tags rest. This resting-block is to place the tags in a proper position to be engaged by the separating or feeding blades 27 28. This adjustable block has a set-screw $30^a$ beneath the table.

31 is a bar pivoted at $31^a$ to the table. $31^b$ is a spring to keep the bar in a retracted position. $31^c$ is a stop. The front end of this bar has a beveled block or wedge $31^d$.

$31^e$ is an adjusting member for regulating the movement of the bar 31. It is fastened to the bar by a screw at one end, and by loosening the screw it can be turned in or out a little to vary the stroke of the bar.

$31^f$ is a bell-crank or lever, and $31^g$ is a connecting-bar from same to the movable blade 28. The movement of this blade causes the bar 31 to move forward by the lever $31^f$ striking the member $31^e$, and the wedge then enters and raises the upper tags above the bottom one at one side, so as to further enable the forward lips of the carrier or plate 24 to engage the bottom tag. The lower side of the block $31^d$ also presses on the lowest tag, so as to hold it while the said lips of the carrier engage the tag. The movement of this bar into said position occurs before the carrier enters under the tag-chute.

The carrier or feed-plate 24 has a transverse groove or recess $24^j$ on the forward end of said plate, so as to provide two lips or flanges $24^h$ and $24^i$, which engage the side edge of the tag X and carry it to the wiring device, which automatically inserts the wire through the eyelet in the tag. A particular and especial feature of these fingers is that the lower one $24^h$, which is preferably rounded on its edge, is square or at right angles to the sides of the plate 24, while the upper flange $24^i$ is diagonal thereto or beveled, as at $24^k$. These two flanges provide the groove $24^j$, which engages the tag. The upper flange may consist of a removable plate. The object of making the flange $24^i$ thus is that the said flange or lip works in gradually between the bottom tag and the upper one. Thus if the wedge $31^d$ opens but a small space between the two tags this diagonal or beveled flange will work its way in nicely, and so carry the tag along.

32 and 33 refer to friction guides or presses in front of the chute and are for keeping the tags uniformly in the proper direction or alinement before they reach the wiring-point. At one side of the table 23 is placed the presser 32, which consists of a longitudinal bar $32^a$, which is secured to a lateral arm $32^b$, pivoted on a bracket $32^c$, and is provided with a spring and set-screw $32^y$ for adjusting the pressure of the bar $32^a$. On the opposite side of the table is a pivoted arm 33, having a bar $33^a$, which bears down on one of the ends of a tag and acts in conjunction with the presser 32, which bears on the opposite end of the tag. These presser-bars provide a certain amount of friction and prevent the tags from twisting about or otherwise getting out of place while being fed to the wiring device.

The bar $33^a$ extends at $33^b$ in the form of a jaw beyond the table-top $23^a$ to near the wire-chucks. A pivotal bar $37^a$, provided with a spring $37^c$, keeps the bar $33^a$ down. The bar $37^a$ also carries the tension device 37. Beneath the part $33^b$ is a similar jaw $33^h$, attached to the table 23 and pressed by bar $38^a$ and spring $38^c$. The jaws $33^b$ and $33^h$ form a pair of nippers, which hold the tag while the wire is being inserted through same.

When the carrier 24 reaches the forward end of its stroke, the tag is shoved over a stop or beveled part 34, which acts as a stripper and prevents the tag from following the carrier 24 when it recedes into a position to carry forward another tag. The stop 34 has an incline, over which the tag rides on its advance, terminating in a shoulder behind which the tag finally drops. Attached at the end of the table-top $23^a$ is a grooved strip $23^x$, which engages and holds the wiring end of the tag while it is being fed between the wire-chucks.

The tag X, after having been left by the carrier 24 and held by the stop 34, is now in a position to be wired. It will be understood, however, that this stop 34 is only intended to keep the tag from following the backward movement of the carrier and as a positive check to keep the tag from going back; but it does not hold the tag horizontally while the wiring device operates. This is accomplished, however, by the nippers 33$^b$ and 33$^h$ and the grooved bar 23$^x$.

I claim—

1. In a tag-wiring machine, feeding mechanism comprising a table, a magazine thereon in which the tags are piled, blades pivoted on the table beside the magazine and arranged to swing into the same in a plane parallel to the table-top, between the lowest tag and the next above, and a sliding carrier movable under the bottom of the magazine and arranged to carry said lowest tag therefrom.

2. In a tag-feeding mechanism, in combination, a magazine in which the tags are piled, a vertical adjustable block in the bottom of the magazine, to regulate the position of the lowest tag, means to separate the lowest tag from those above, and means to carry said lowest tag therefrom.

3. In a tag-feeding mechanism, in combination, a table, a magazine thereon in which tags are piled, a blade pivoted to the table and arranged to swing horizontally into the magazine in a plane parallel to the bottom thereof, between the lowest tag and those above, means to give the blade a slight lifting motion, to free the lowest tag, and a sliding carrier movable across the bottom of the magazine and arranged to carry said tag therefrom.

4. In a tag-feeding machine, in combination, a table, a magazine thereon, a blade movable into the magazine, between the lowest tag and those above, a stud projecting upwardly from the table in the path of the blade and up which the blade rides after it enters between the tags, to free the lowest tag from those above, and a sliding carrier movable under the blade and constructed to carry a tag from the magazine.

5. In a tag-feeding mechanism, in combination, a magazine in which tags are piled, and a carrier-plate slidable under the magazine and having a groove in its front edge, the edge above the groove being inclined laterally, to present a corner in advance at one side, adapted to enter between the lowest tag and those above.

6. In a tag-feeding mechanism, in combination, a table, a magazine thereon in which tags are piled, a carrier movable thereunder and adapted to remove the lowest tag, and a lever pivoted to the table-top and swinging in a plane parallel to said top and having a wedge movable in between the said tag and those above, to separate the same and allow the carrier to engage said tag.

In testimony whereof I have signed my name to this specification in the presence of two subscribing witnesses.

JOSEPH J. ENGLERT.

Witnesses:
 NELLIE FELTSKOG,
 H. G. BATCHELOR.